(12) United States Patent
Leith

(10) Patent No.: US 10,183,528 B2
(45) Date of Patent: Jan. 22, 2019

(54) AXEL ASSEMBLY

(71) Applicant: Panther Machine, Inc., Wixom, MI (US)

(72) Inventor: Donald Leith, Wixom, MI (US)

(73) Assignee: Panther Machine, Inc., Wixom, MI (US)

( * ) Notice: Subject to any disclaimer, the term of this patent is extended or adjusted under 35 U.S.C. 154(b) by 0 days.

(21) Appl. No.: 15/298,326

(22) Filed: Oct. 20, 2016

(65) Prior Publication Data

US 2018/0111418 A1    Apr. 26, 2018

(51) Int. Cl.
   *B60B 35/02*    (2006.01)
   *B60B 35/04*    (2006.01)
   *B60B 27/06*    (2006.01)

(52) U.S. Cl.
   CPC .......... *B60B 35/025* (2013.01); *B60B 27/065* (2013.01); *B60B 35/04* (2013.01); *B60B 2310/204* (2013.01); *B60B 2310/228* (2013.01); *B60B 2310/302* (2013.01); *B60B 2360/10* (2013.01); *B60B 2360/102* (2013.01)

(58) Field of Classification Search
   CPC . Y10T 403/47; Y10T 403/472; B60B 35/025; B60B 35/04; B60B 27/065; B60B 2310/302; B60B 2310/228; B60B 2310/204; B60B 2360/10; B60B 35/00; B60B 35/02; B60B 35/14; B60B 2310/321; B60B 2310/3023; B60B 2310/303

USPC ........ 301/124.1, 125, 126, 131, 132, 105.1; 403/359

See application file for complete search history.

(56) References Cited

U.S. PATENT DOCUMENTS

| | | | | |
|---|---|---|---|---|
| 1,840,941 | A * | 1/1932 | Eksergian | B21D 53/265 |
| | | | | 29/894.361 |
| 4,659,005 | A * | 4/1987 | Spindler | B23K 20/129 |
| | | | | 228/113 |
| 4,768,839 | A * | 9/1988 | Spindler | B23K 20/129 |
| | | | | 301/124.1 |
| 6,572,199 | B1 * | 6/2003 | Creek | B60B 35/08 |
| | | | | 301/124.1 |
| 9,440,490 | B2 * | 9/2016 | Crockett, Jr. | B60B 27/02 |
| 2014/0139013 | A1 * | 5/2014 | Dziekonski | B60B 35/04 |
| | | | | 301/126 |

FOREIGN PATENT DOCUMENTS

GB    2024338 A    *    1/1980    ............ F16C 23/084

* cited by examiner

*Primary Examiner* — S. Joseph Morano
*Assistant Examiner* — Jean W Charleston
(74) *Attorney, Agent, or Firm* — Dinsmore & Shohl LLP

(57) ABSTRACT

An axle assembly having a wheel flange with a central opening and a slot having an end dimensioned to fit within the wheel flange central opening. A molten binder, such as molten zinc, fills the space in between the wheel central opening and the shaft end. Upon cooling, the binder locks the wheel flange and shaft together.

9 Claims, 3 Drawing Sheets

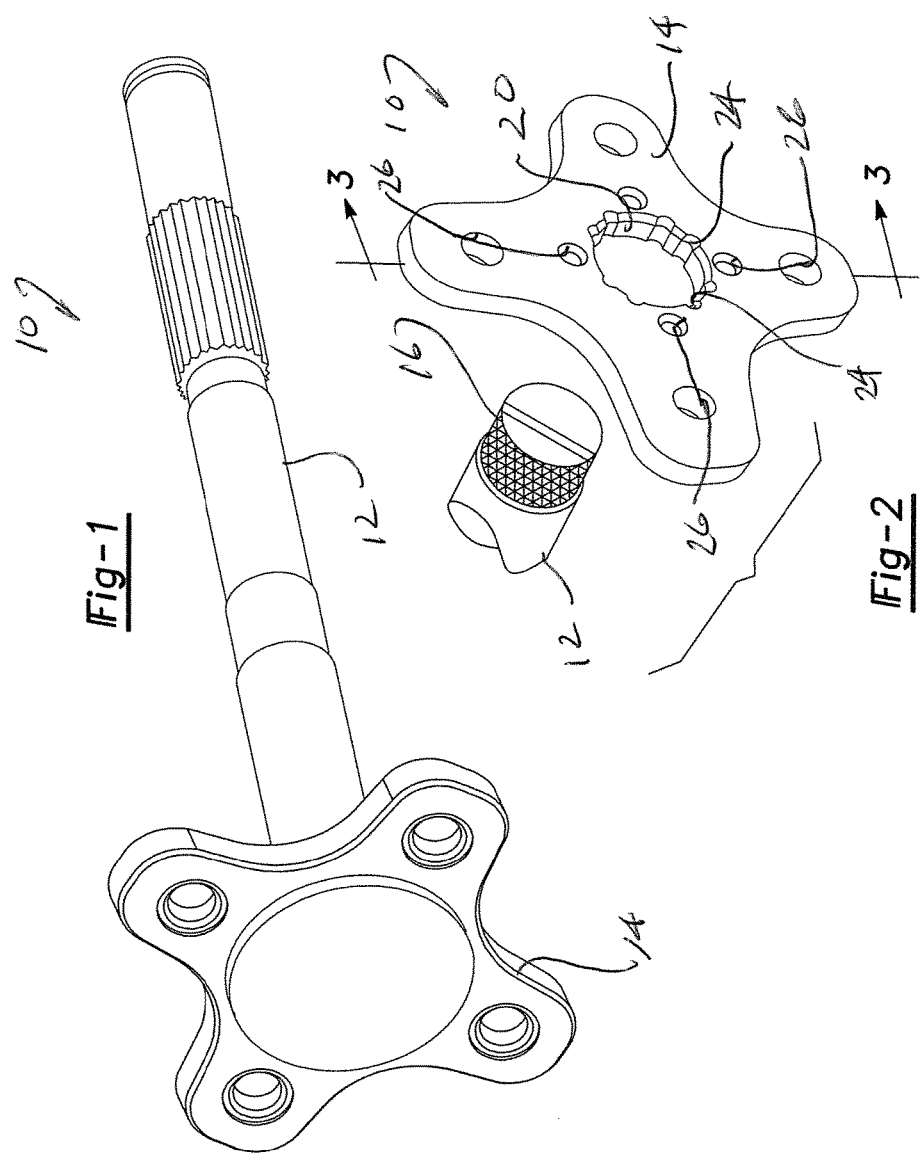

ial ization of the axle assembly and transmission having a shaft with a wheel flange formed at one end of the shaft. Previously, many of these axle assemblies have been of a one piece construction in which the axle assembly is first formed by casting a metal part in the general form of the axle assembly and thereafter machining the molded part to its final form. Such machining, furthermore, often requires a plurality of different machining operations.

AXEL ASSEMBLY

BACKGROUND OF THE INVENTION

I. Field of the Invention

The present invention relates to an axle assembly for small motors including a method for constructing the same.

II. Description of Related Art

There are many products, such as snowmobiles, golf carts, chainsaws, small motorized vehicles, and the like, which utilize small internal combustion engines to power them. In these products, the overall cost of construction is an important, if not the most important, criteria for the engine.

Many of these devices that are powered by an internal combustion engine include an axle assembly and transmission having a shaft with a wheel flange formed at one end of the shaft. Previously, many of these axle assemblies have been of a one piece construction in which the axle assembly is first formed by casting a metal part in the general form of the axle assembly and thereafter machining the molded part to its final form. Such machining, furthermore, often requires a plurality of different machining operations.

The necessity to perform multiple machining operations, as well as the initial forging operation, in order to completely machine the axle assembly is not only time consuming, but expensive. Indeed, the expense of the axle assembly significantly increases the overall cost of the engine.

SUMMARY OF THE PRESENT INVENTION

The present invention provides an axle assembly which overcomes the above-mentioned disadvantages of the previously known axle assemblies.

In brief, the axle assembly of the present invention comprises a wheel flange having a central opening. Preferably, the wheel flange is formed from powdered metal which requires little or no further machining after the wheel flange is molded from the powdered metal. The wheel flange may be formed from any conventional powdered metal material and includes a central opening.

An elongated shaft then has an end connection to fit within the wheel flange central opening. The shaft itself is machined from metal, such as steel, in the conventional fashion. Furthermore, one end of the shaft includes a plurality of external splines.

The splined end of the shaft is dimensioned to fit within the central opening of the wheel flange. When the wheel flange and shaft are aligned as desired relative to each other, a binder, such as liquid zinc, is then injected in between the wheel flange and the shaft so that, upon cooling, the binder locks the wheel flange and shaft together. Additional through openings through the wheel flange are preferably formed which also receive the binder. Consequently, once the binder has cooled and solidified, the wheel flange and shaft are rigidly held together.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a fragmentary exploded view illustrating the assembly of the axle assembly;

DETAILED DESCRIPTION OF A PREFERRED EMBODIMENT OF THE PRESENT INVENTION

With reference first to FIGS. 1 and 2, a preferred embodiment of the axle assembly 10 of the present invention is shown. The axle assembly 10 includes an elongated shaft 12 having a wheel flange 14 attached at one end 16 of the shaft 12 in a fashion that will be subsequently described in greater detail.

The wheel flange 14 is preferably constructed from powdered metal which is molded into its desired shape by a mold (not shown) and then sintered. Consequently, the overall shape of the wheel flange 14 is generally flat and planar. Furthermore, little, if any, machining is required after the wheel flange 14 is molded into its desired shape and sintered which results in a low-cost construction.

Figure 3:
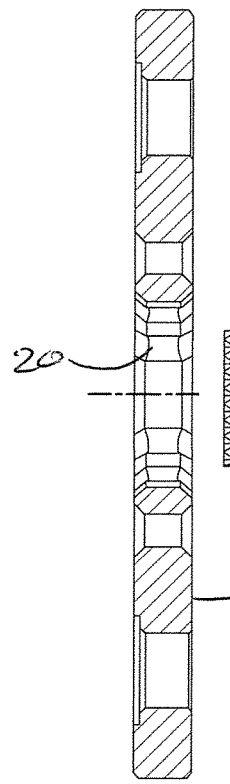
FIG. 3 is an exploded fragmentary side view.

Referring now particularly to FIGS. 1 and 3, the wheel shaft 12 is constructed in a conventional fashion from a hard material, such as a steel alloy. The shaft is machined into its form and, once the machining is completed, heat treated for increased strength of the shaft 12. Any conventional means, such as induction heating, may be used to strengthen the shaft 12 and a final grinding operation may be performed following the heat treatment of the shaft 12.

Figure 4:
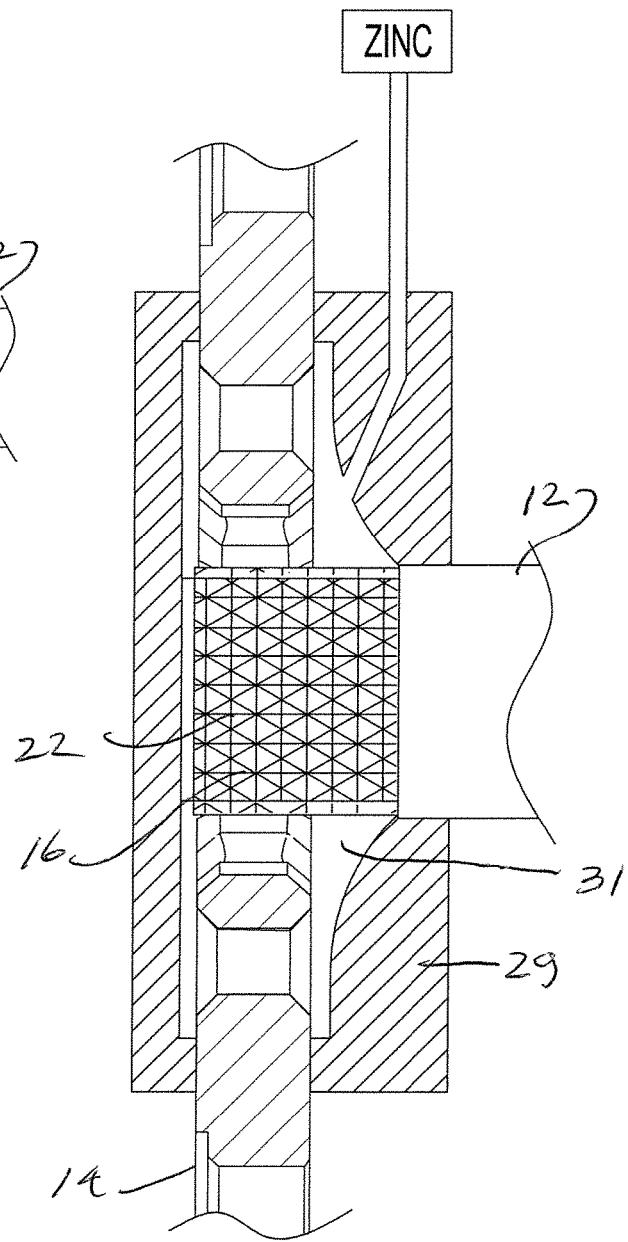
FIG. 4 is a fragmentary longitudinal sectional view of the axle assembly prior to injection of the molten zinc.
Figure 5:
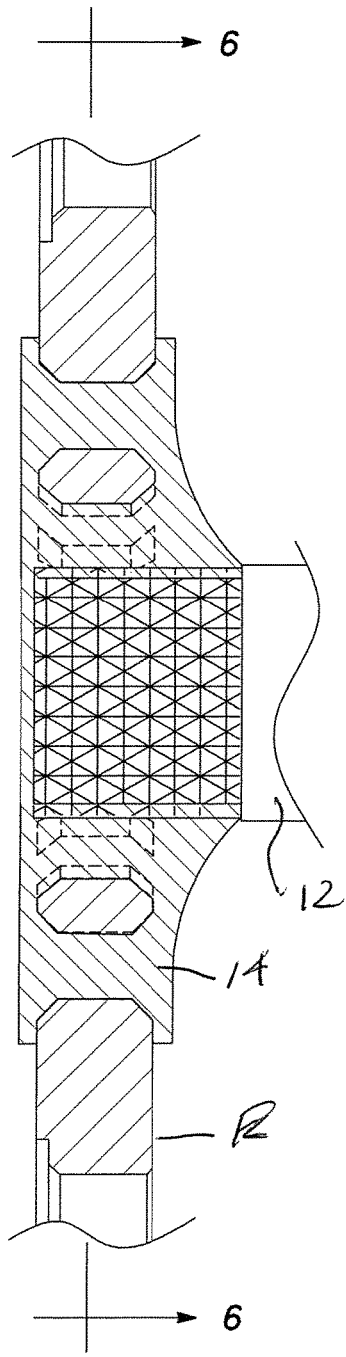
FIG. 5 is a view similar to FIG. 3 but after the zinc injection.

As best shown in FIGS. 2 and 3, the wheel flange 14 includes a central throughbore 20 having a diameter greater than the diameter of the end 16 of the shaft 12. This end 16 of the shaft 12 is then positioned centrally within the through bore 20 as shown in FIG. 4. Furthermore, the end 16 of the shaft 12 is machined into a noncircular shape, such as by knurling 22.

Figure 6:
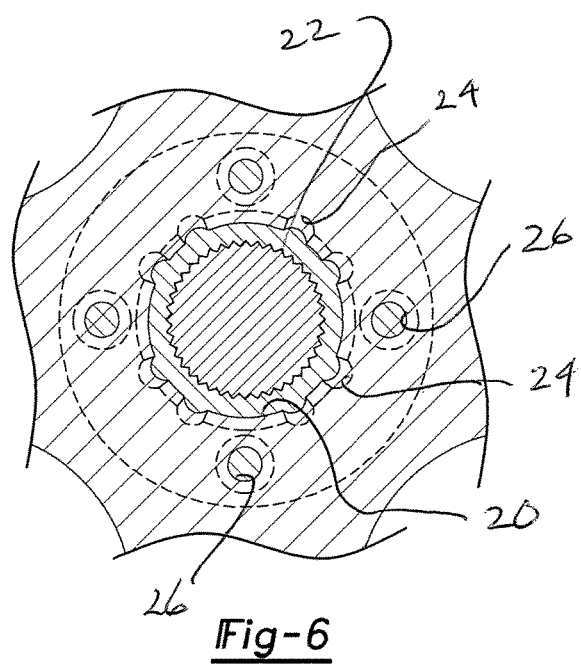
FIG. 6 is an end sectional view.

As best shown in FIGS. 2 and 6, the opening 20 in the flange 14 is noncircular in shape and includes a plurality of cutouts or scallops 24 around the opening 20. Furthermore, at least one, and preferably a plurality of through bores 26 are formed through the wheel flange 14 when the wheel flange 14 is initially formed. These through bores 26 are preferably circumferentially equidistantly spaced around the central opening 20.

After the wheel flange 14 has been fully molded and the shaft 12 machined as previously described, the knurled end 16 of the shaft is positioned centrally within the wheel flange 20 as shown in FIG. 4. Appropriate jigs (not shown) are employed to align the wheel flange 14 and shaft together so that the wheel shaft 12 is perpendicular to the wheel flange 14. The aligned shaft 12 and flange 14 are positioned within a mold 29 which forms a molding chamber 31 around the end of the shaft 12 and a central portion of the wheel flange 14.

Molten zinc is cast into the chamber 31 around the end 16 of the shaft so that the liquid zinc 30 fills not only the space between the end 16 of the shaft 12 and the wheel flange 14, but also extends through and completely fills the holes 26 formed through the wheel flange 14. This liquid zinc also fills within the uneven nor noncircular outer surface of the shaft 12 as well as within the noncircular recesses in the flange 14.

As the zinc 30 cools, the zinc 30 sets and becomes rigid. Upon doing so, the zinc 30 fills not only the noncircular opening 20 and cutouts 24 in the wheel flange 14, but also the noncircular outer surface of the shaft 12 formed by the knurling 22. Consequently, once the molten zinc 30 is set, the zinc 30 rigidly secures the shaft 12 and wheel flange 14 together and with the wheel flange 14 perpendicularly aligned relative to the shaft 12.

From the foregoing, it can be seen that the present invention provides a simple and inexpensive axle assembly which can be accurately and repeatedly manufactured to high precision at relatively low cost. Having described my invention, however, many modifications thereto will become apparent to those skilled in the art to which it pertains without deviation from the spirit of the invention as defined by the scope of the appended claims.

I claim:

1. An axle assembly comprising:
   a wheel flange having a central opening including a plurality of circumferentially spaced cutouts,
   a shaft having an end dimensioned to fit within said wheel flange central opening, said end of said shaft including a knurled surface,
   a binder which fills a space between said wheel central opening and said shaft end and locks said wheel flange and said shaft together wherein the binder fills the knurled surface and the plurality of circumferentially spaced cutouts securing the shaft to the wheel flange.

2. The axle assembly as defined in claim 1 wherein said wheel flange is constructed from powdered metal.

3. The axle assembly as defined in claim 2 wherein said wheel flange is planar in shape.

4. The axle assembly as defined in claim 1 wherein an outer surface of said one end of said shaft is splined.

5. The axle assembly as defined in claim 1 wherein said shaft is constructed from a steel alloy.

6. The axle assembly as defined in claim 1 wherein said wheel central opening is noncircular in shape.

7. An axle assembly comprising:
   a wheel flange having a central opening,
   a shaft having an end dimensioned to fit within said wheel flange central opening,
   a binder which fills a space between said wheel central opening and said shaft end and locks said wheel flange and said shaft together;
   wherein said wheel flange includes at least one through hole positioned radially outwardly from said central opening, said binder extending through and filing said through hole.

8. The axle assembly as defined in claim 7 and comprising a plurality of through holes.

9. The axle assembly as defined in claim 8 wherein said through holes are circumferentially equidistantly spaced around said central opening.

* * * * *